Nov. 30, 1948. C. S. EVANS 2,455,244
STUD FOR WELDING
Filed April 4, 1944
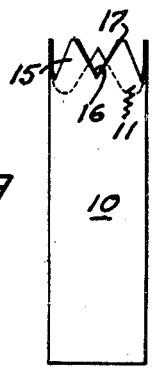
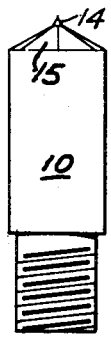
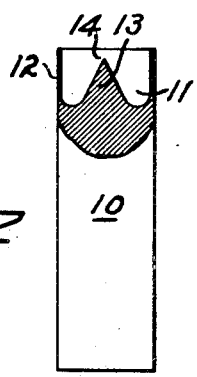
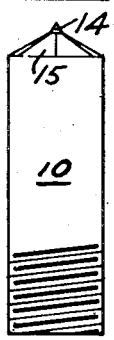
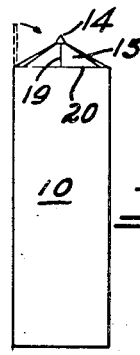
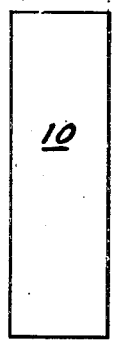
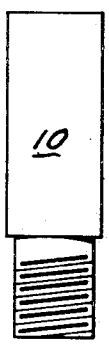
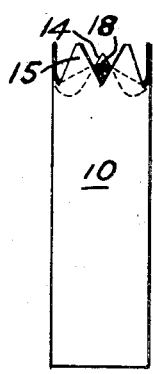
INVENTOR
Charles S. Evans Patented Nov. 30, 1948

2,455,244

UNITED STATES PATENT OFFICE 2,455,244

STUD FOR WELDING

Charles S. Evans, Atherton, Calif., assignor, by mesne assignments, to Morton Gregory Corporation, a corporation of Michigan Application April 4, 1944, Serial No. 529,543

5 Claims. (Cl. 287—20.2)

My invention relates to studs, usually short cylindrical pieces of steel, intended to be welded to a base plate.

The principal object of the invention is the provision of a flux bearing stud made from a single piece of material. Another object is the provision of a flux bearing stud cheaper to make and capable of a higher speed through the manufacturing steps than the studs now in common use. Still another object is the provision of a stud having a well defined point on the welding end which is integral with the body of the stud, and by which the stud is accurately placed on a mark for welding.

My invention possesses other objects and features of value, some of which with the foregoing will be set forth in the following description of the invention. It is to be understood that I do not limit myself to the showing made by the said description and the drawings as I may adopt variant forms of the invention within the scope of the appended claims.

Referring to the drawings: Figures 1 to 5 inclusive are side elevations of a cylindrical piece of metal turned by successive steps into a complete stud. Figure 1 shows the blank cylindrical rod from which the stud is to be made. Figure 2, in part section, shows the welding end recessed. This operation is the first forming step after the blank rod enters the turret chuck of the forming machine. Figure 3 shows the next forming step in the shaping of the closure tabs. Figure 4 shows the stud with a load of flux in the recess. Figures 5 and 6 show respectively side elevation and top view of the completed stud, the closure tabs being folded in against the central cone. Figure 7 is a side elevation of a threaded shoulder stud embodying my invention; and Figure 8 is a side elevation of the shoulder stud after the first forming steps have been completed and before the recessing of the welding end shown in Figure 2. Figure 9 is a side elevation of a stud embodying my invention and having a threaded end.

To one familiar with turret machine operations, it will be clear that the several manufacturing steps illustrated in the drawings can readily be performed by such a machine designed for the purpose. Since the present invention has to do solely with the stud, only brief reference will be made to the machine preferred for its manufacture. Such machine includes a turret head revolving in a step-by-step motion to bring successively into receiving, recessing, forming, flux loading, closing and discharging positions or stations a series of six stud-holding chucks mounted in the turret head. At each pause of the turret head, a stud is fed into a chuck emptied on the previous pause; and an operation is performed on a stud held in a preceeding chuck.

In terms of broad inclusion my stud comprises a piece of cylindrical rod of a length slightly longer than the height of the stud after it has been welded in place. One end of the piece is chambered to hold a small quantity of flux, the chamber being annular and so formed as to leave a thin annular wall or flange having the original diameter of the rod and surrounding a central conical point. This flange is then cut into blunt pointed closure tabs which after placing the flux in the chamber, are bent inwardly against the central cone to form a tight closure for the chamber, leaving the point of the central cone extending a short distance beyond the fluxed head thus formed.

The stud may be furnished plain as shown in the drawings, Figures 1 to 5 inclusive, but frequently the stud is desired with threads on the end opposite the welding end; and such threads may be cut or rolled in the full body of the stud, or in an end reduced in diameter to provide a shoulder stud as shown in Figure 7. When threads are to be formed on a shoulder stud embodying my invention, it is preferred to form the threaded end first; and in such a case, instead of the blank shown in Figure 1, the blank shown in Figure 8 is presented for the recessing operation indicated in Figure 2.

A succession of blanks is provided as shown in Figure 1 (or Figure 8) comprising short pieces of cylindrical steel rod of predetermined length. These pieces are fed one at a time by appropriate means into the successively presented chucks of the turret head. The blank enters the chuck in a line parallel to the axis about which the turret revolves in a step-by-step movement; and so is carried successively under tools for recessing, shaping the closure tabs, loading flux into the recess, folding in the tabs to close the recess; and finally to the point of discharge, where the chuck opens and the finished stud drops into a chute leading to the packing table, or otherwise as desired.

If the stud is to be threaded or shouldered and threaded, it is preferred to perform these operations first in suitable machines already in common use, the threaded studs being delivered with threaded end down to the chucks of the turret head in which the stud of the present invention is made.

The chuck receives the blank stud (Figure 1 or Figure 8) during a pause and tightens about the body 10; then moves to the next station where the stud is held fixedly for a moment. During this pause a rotating forming tool is applied to the stud end and then withdrawn, leaving a chamber or recess 11 surrounded by a thin peripheral wall or flange 12, Figure 2, having the same outside diameter as the main body. The thickness of this flange is not critical, but is controlled to a degree by the character of the steel in the stud. From .015" to .035" is suggested as suitable for most steels.

In this operation, the forming tool also leaves a centrally or axially placed cone or spike 13 extending upwardly into a point 14 somewhat below the level of the end edge of the flange 12. The proportion of these parts to each other and to the diameter of the stud must be accurately determined in order to make a tight closure around the spike 13 as illustrated in Figure 5; and of course, the depth and shape of the bottom of the chamber are determined by the quantity of flux to be carried.

After the chambering tool is withdrawn, the turret head moves another step to position the chambered stud at the tab forming station, where a recessed supporting core drops into the chamber; and a plurality (preferably 6) of radially disposed shear punches are pushed in from the outside, shearing out triangular pieces of the flange 12, and leaving the blunt pointed tabs 15 surrounding the spike 13. The bottoms 16 of the triangular cuts are spaced above the bottom of the chamber 11, and this distance too must be accurately determined to accord with the desired flux capacity. The extreme ends 17 of the tabs are left flat so that when folded over to form a closure against the central spike as shown in Figures 5 and 6, the contact with the spike may be effected well back from its point 14.

Upon the withdrawal of the supporting core and shear punches, the turret head again moves a step, and positions the stud at the flux loading station. Here a measured quantity of a suitable flux 18 such as a mixture of finely divided aluminum and iron is deposited in the bottom of the chamber.

The next step-by-step movement of the turret head carries the now loaded stud to the tab-folding station where a suitably formed die folds over the tabs 15, abutting their lateral edges 19 tightly together, and jamming their blunt points into intimate and tight engagement with the spike 13 just below its point. If the point 14 projects from .040" to .060" it will be generally satisfactory. Tight engagement of the straight tab ends with the conical surface of the spike offers no difficulty, nor does the folding of the tab on the arc 20 of its base, since the steel is ductile enough to flow and/or distort the small amount required under pressures easily applied at this station.

The stud is now complete, as shown in Figures 5 and 6 (or Figures 7 and 8 if a threaded shoulder stud is made); consisting of a single, integral piece of metal enclosing in one end a charge or load of flux to facilitate its later welding.

The next movement of the turret head carries the completed stud to the discharge station, where it is released from the chuck to fall into a chute or conduit through which it passes to a receptacle or to the packing table.

Where a stud is desired having a thread rolled into the body at the end opposite the flux load as shown in Figure 9, the thread rolling operation may be left to the last; and the loaded stud passed through the discharge conduit directly to the rolling press. Since the studs are dropped into the conduit with like ends always in the same direction, this relationship is readily maintained in feeding the studs into the press, so that no sorting of the studs for position is necessary.

The speed of production of my stud is of course that of the slowest step,—the chambering of the end. If desired, this operation may be divided equally between two stations with a rough cut and a finishing cut. Assuming the same turret speed between stations, this would permit a shorter pause at each station. This gives a net increase in turret speed, and therefore in quantity of studs per unit of time, amounting to so much as 12½%. This of course requires a seven-chuck turret head with seven operating stations instead of six. However the best speed that can be made is slower than the thread rolling operation, and it is therefore contemplated that for continuous capacity production a battery of two forming machines will be organized to operate with one thread rolling press.

I claim:

1. A stud for welding comprising a rod having on the welding end a plurality of tabs converging together to provide a chamber, and a welding flux in the chamber.

2. A stud for welding comprising a rod having on the welding end an axially disposed spike, and a plurality of tabs disposed about the spike and converging to the spike to provide a chamber, and a welding flux in the chamber.

3. A stud for welding comprising a rod having on the welding end an integral spike, and an integral flange structure bent inwardly toward the spike to provide therewith a chamber, and a welding flux in the chamber.

4. A stud for welding comprising a rod having on the welding end an axially disposed integral spike terminating in a point for positioning the stud, and a welding flux surrounding the spike.

5. A stud for welding comprising a rod having on the welding end a chamber and an integral spike terminating in a point for positioning the stud, and a welding flux in the chamber.

CHARLES S. EVANS.

REFERENCES CITED

The following references are of record in the file of this patent:

UNITED STATES PATENTS

| Number | Name | Date |
|---|---|---|
| Re. 22,411 | Nelson | Dec. 21, 1943 |
| 1,266,485 | Kingston | May 14, 1918 |
| 1,704,978 | Knott | Mar. 12, 1929 |
| 1,860,521 | Anderson | May 31, 1932 |
| 2,216,979 | Michael | Oct. 8, 1940 |
| 2,268,416 | Nelson | Dec. 30, 1941 |